United States Patent [19]

Bleiweiss et al.

[11] 4,320,385
[45] Mar. 16, 1982

[54] ROTATING WARNING LAMP

[75] Inventors: Arthur F. Bleiweiss, Toronto; Robert J. Wilkes, Caledon East; Trevor E. Topley, Tottenham, all of Canada

[73] Assignee: Dominion Auto Accessories Limited, Toronto, Canada

[21] Appl. No.: 896,730

[22] Filed: Apr. 17, 1978

Related U.S. Application Data

[63] Continuation of Ser. No. 727,953, Sep. 26, 1976, abandoned.

[51] Int. Cl.³ ............................................. B60Q 1/46
[52] U.S. Cl. ..................................... 340/133; 340/50; 340/84; 340/87; 362/35
[58] Field of Search ............... 340/133, 84, 87, 114, 340/90, 92, 25, 50; 362/35, 269, 285

[56] References Cited

U.S. PATENT DOCUMENTS

| | | | |
|---|---|---|---|
| 2,578,239 | 12/1951 | Gosswiller | 340/50 |
| 3,117,302 | 1/1964 | Cardarelli | 340/50 |
| 3,271,735 | 9/1966 | Gosswiller | 340/87 |
| 3,633,161 | 1/1972 | Price | 340/133 |
| 3,732,537 | 5/1973 | Freeman | 340/50 |
| 3,784,809 | 1/1974 | Smith | 340/50 |
| 4,004,274 | 1/1977 | Menke et al. | 340/50 |

Primary Examiner—John W. Caldwell, Sr.
Assistant Examiner—Donnie L. Crosland
Attorney, Agent, or Firm—Barnes, Kisselle, Raisch & Choate

[57] ABSTRACT

A rotating lamp comprising a lamp base and an electric motor mounted on the lamp base. The electric motor drives a hollow shaft on which the lamps are mounted. A conductive rod extends through the shaft and is electrically isolated from the shaft. The lamps which are mounted on the shaft are electrically interconnected between the rod and the shaft. The housing of the electric motor is electrically isolated from the base. Brush means provide electrical continuity between the power source and the rod. Additional brush means provide electrical continuity between the shaft and the base.

9 Claims, 4 Drawing Figures

FIG. 2

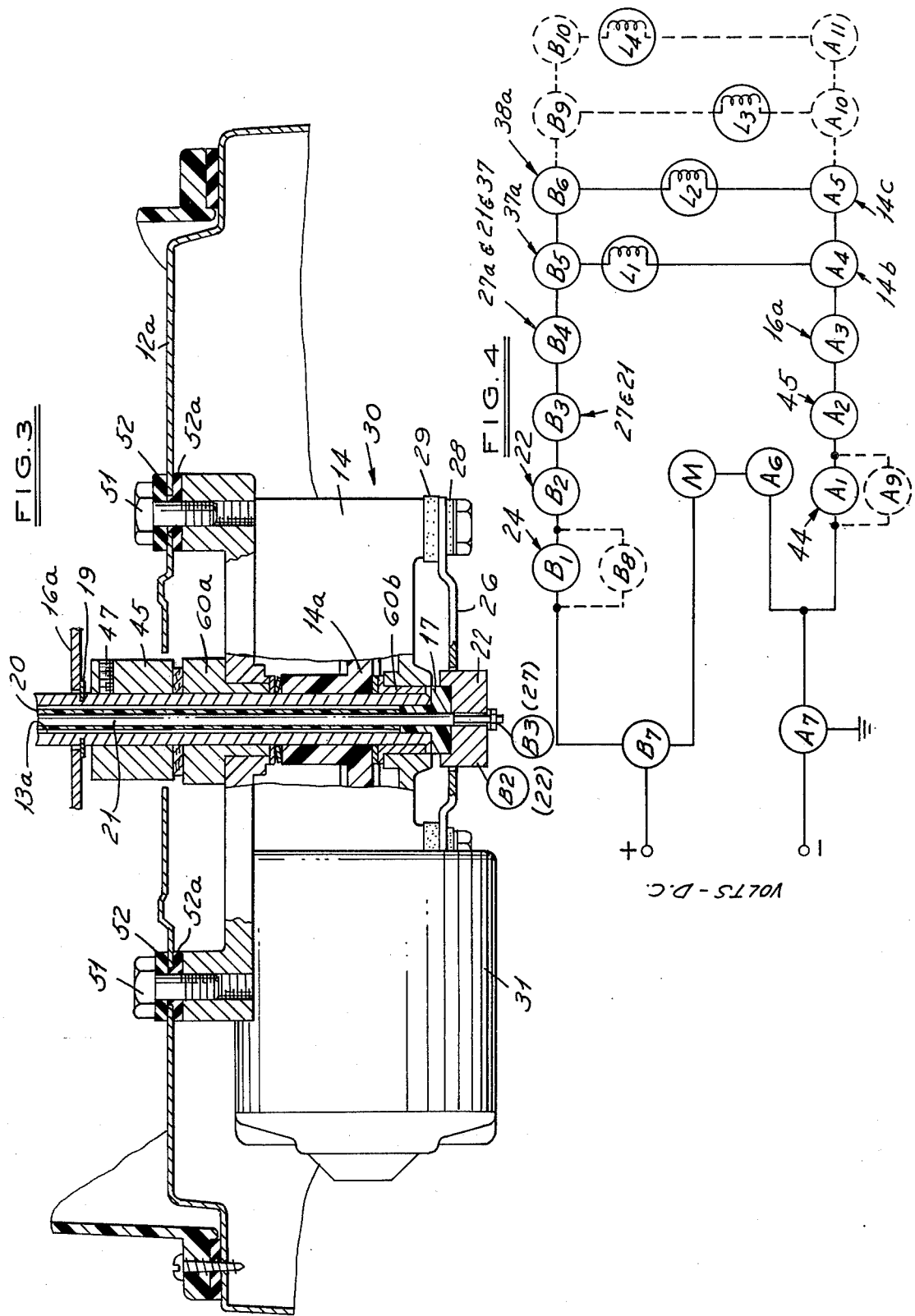

ROTATING WARNING LAMP

This is a continuation of application Ser. No. 727,953, filed Sept. 26, 1976, now abandoned.

This invention relates to rotating warning lamps and specifically to improvements in thier application in heavy-duty construction and industrial machinery.

BACKGROUND OF THE INVENTION

Devices used to warn approaching motorists of a hazardous condition are generally constructed in a manner to facilitate the rendering of visual signals over a complete field of 360 degrees. Consequently, such devices generally comprise a plurality of sealed beam lamps rotating about a vertical axis.

The utilization of such devices on heavy equipment, such as snow plows, road graders and the like, has generally resulted in severe problems due to reductions to normal life-expectancy. Experimentation has determined that these abnormally premature failures are caused by the mechanical exaggeration of electrical erosion at current carrying bearing or journal points. Normal applications of such devices use the rotating shaft of the device to carry current to the sealed beam bulbs. This results in an appreciable degree of arcing activity between the shaft and the journal bushings. In the presence of severe vibration loads, the constant motion serves to significantly amplify the arcing factor, giving rise to a spark-erosion condition. As the shaft rotates about its axis, circumferentially encompassed by the journal bushing, the effect of normal friction is grossly increased by the combined factors of increased shaft and journal temperatures and the erosion generated particles from the generally soft journal bushing. The direct result is the formation of an abrasive lapping compound which rapidly deteriorates the basic dimensional accuracies of fit initially established. As the clearance between the components increases, the arcing increases in severity and the factors causing failure are aggravated.

Therefore, the invention is directed to a rotating warning lamp wherein the lamp current does not pass through the shaft-journal interconnection and, preferably, the motor current also does not pass through the shaft-journal interconnection.

SUMMARY OF THE INVENTION

In accordance with the invention, the rotating lamp embodying the invention comprises a housing and an electric motor mounted on the housing. The electric motor drives a shaft on which the lamps are mounted. Means are provided for preventing the lamp current from passing through the journals which rotatably support the shaft.

DESCRIPTION OF THE DRAWINGS

FIG. 2 is a vertical sectional view thereof.

FIG. 3 is a fragmentary sectional view.

FIG. 4 is a wiring diagram of the lamp.

DESCRIPTION

Figure 1:
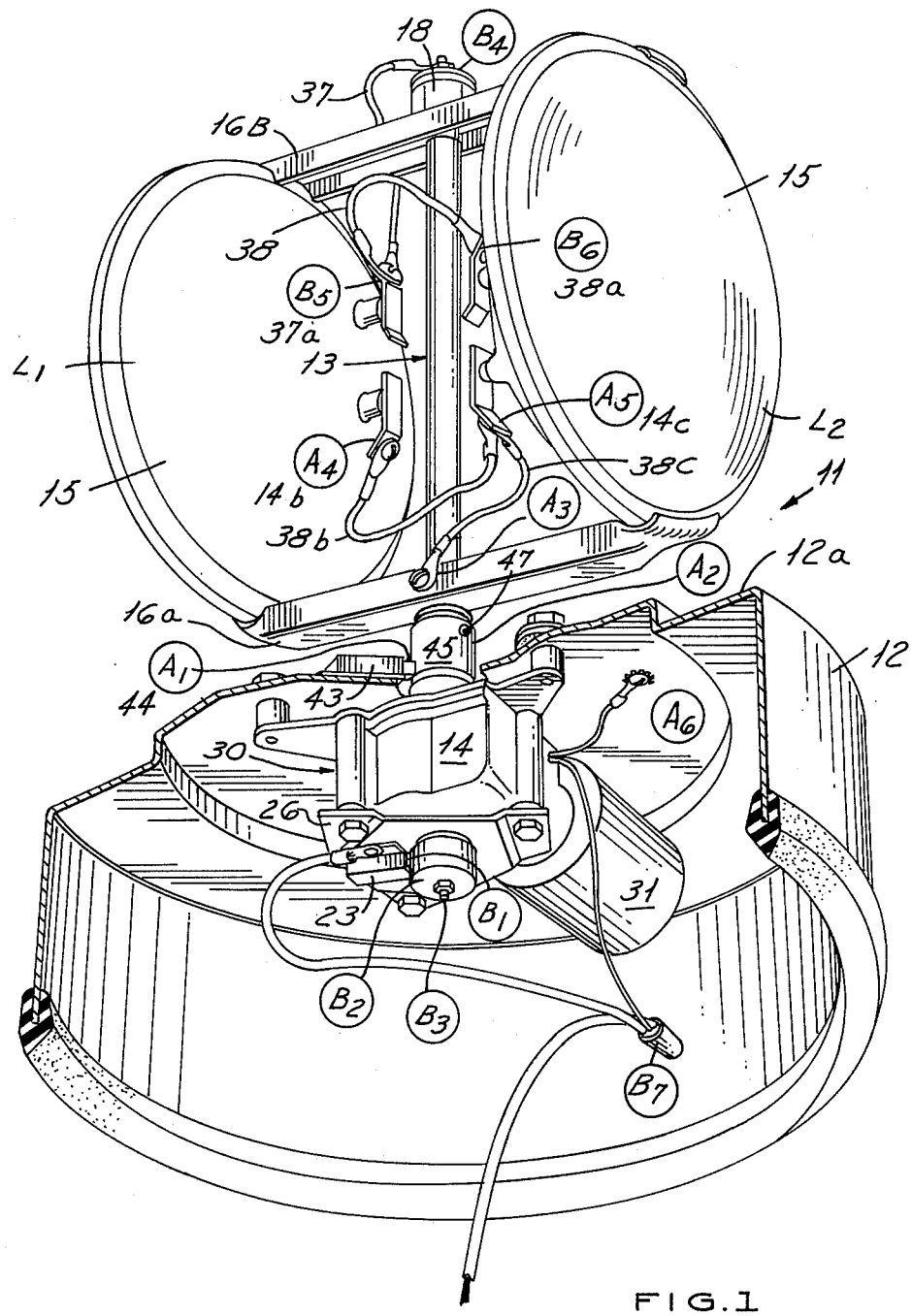
FIG. 1 is a perspective view of a rotating warning lamp embodying the invention.

Referring to the drawings, the rotating warning lamp 11 comprises a base having a transverse top wall 12a, an electric motor assembly 30 mounted securely to the underside of the top wall 12a, and a rotatable vertical shaft 13 extending upwardly from the gear box section 14 of the motor assembly 30. A plurality of sealed beam lamps 15 are mounted on the shaft 13 by an upper bracket 16b and a lower bracket 16a. The assembly of lamps 15 and brackets 16a, 16b is maintained in position on the shaft 13 by a retaining ring 19 at the bottom which snaps into a groove in shaft 13 and a nut 18 at the top (FIGS. 2 and 3).

Shaft 13 is hollow and has a through-bore 13a. An insulating tube 20 surrounds an electrically-conductive rod 21 which passes through shaft 13. The rod 21 is electrically connected to the sealed beam lamps through wires 37, 38 made to positive contacts 37a, 38a of the sealed beams 15. A nut 27a is threaded on rod 21 to retain the end of wire 37 against insulating washer 27b and complete the circuit to rod 21. The lower end of the rod 21 has an annular contact 22 held in place by a nut 27. Contact 22 passes through a clearance hole in plate 26 and is electrically isolated from the shaft 13 by the shouldered insulating bushing 17. Plate 26 is rigidly mounted onto the electric motor assembly 30 by bolts 25. It is electrically insulated therefrom by insulating washers 28, 29 which encircle bolts 25. Brush assembly 23 which is mounted on plate 26 includes a brush 24 yieldingly urged against contact 22 (FIG. 2). A terminal 35 is connected to the brush assembly 23 and a lead 35a provides a circuit between the supply system, noted as a battery, and the sealed beam lamps 15. The gear box 14 includes shaft journals 60a, 60b. Shaft 13 is mounted through journals 60a, 60b. Gear 14a in gear box 14, part of motor assembly 30, is mounted on shaft 13. The motor assembly 30 and gear box 14 are mounted on top wall 12a of the base 12 by bolts 51 which pass through electrically insulating washers 52, 52a. Washers 52, 52a insulate top wall 12a, which is electrically connected to circuit ground, from motor assembly 30 including gear box 14 and shaft journals 60a, 60b.

A contact member 45 spaced from top wall 12a is held in place on shaft 13 by a set screw 47 and a brush assembly 43 on wall 12a yieldingly urges a brush 44 against contact member 45 to provide electrical continuity between the shaft 13 and the top wall 12a. The brush assembly 43 is fastened to the top wall 12a by suitable means, such as one or more tubular rivets 62 and the brush lead 61 is clamped therebetween.

Figure 2:
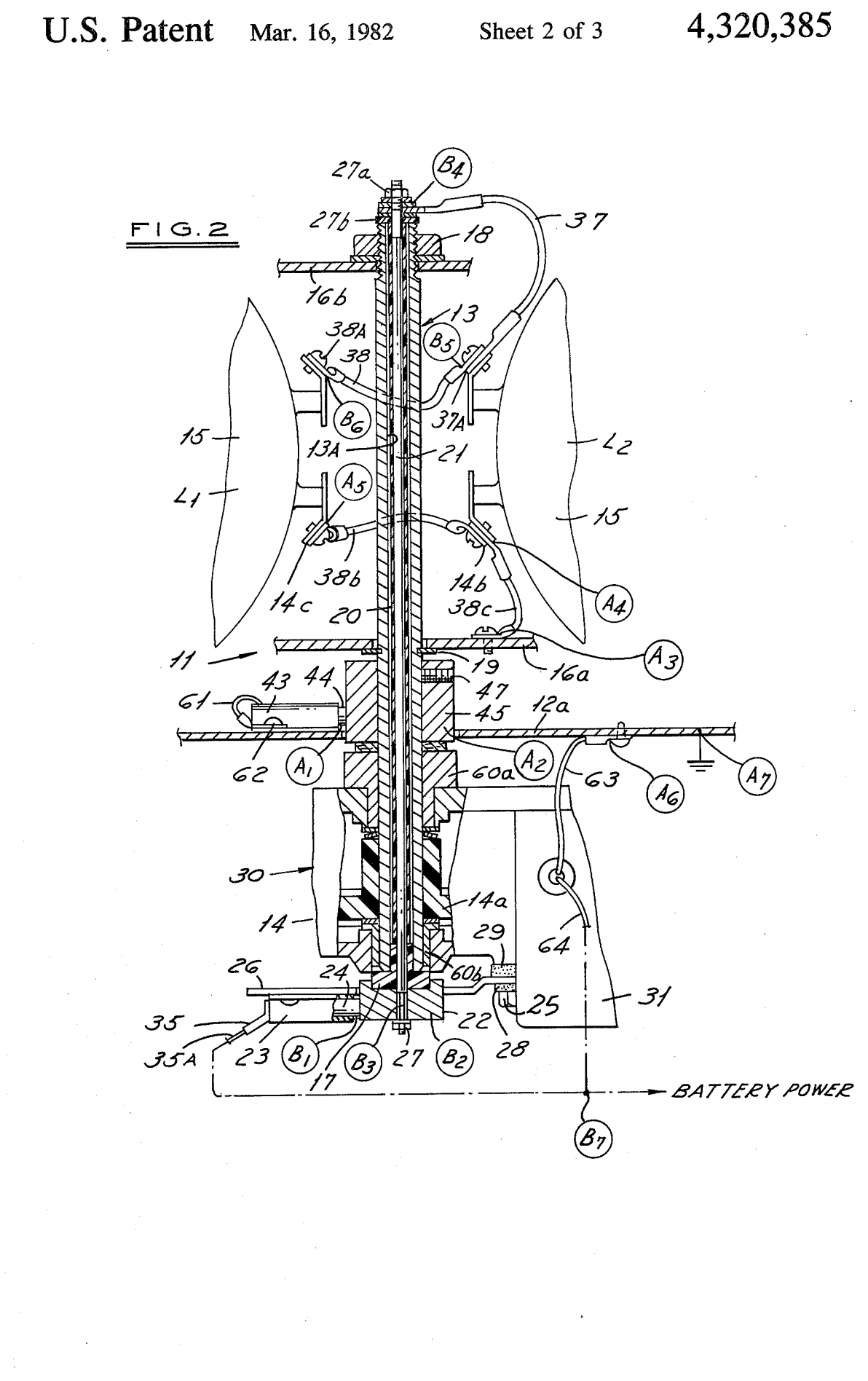

As shown in FIG. 2, the sealed beam contacts 14b and 14c are interconnected by a wire 38b and a wire 38c extends from contact 14b therefrom to lower support bracket 16a. The lower support bracket 16a is, in turn, electrically connected through shaft 13 to contact 45. The lamp circuit current passes between the shaft 13 and top wall 12a only by means of the brush assembly 43. Thus, the shaft-journal interconnection is electrically inert. The source of power such as a battery is connected to the motor 31 of motor assembly 30 by a lead 64. A ground lead 63 from the motor extends to base 12a.

The circuit thus formed is shown in FIG. 4 with corresponding contact points identified in FIG. 2. Current from the battery is supplied to point $B_1$ at brush 24, to point $B_2$ (annular contact 22), then to point $B_3$ (rod 21) to points $B_4$, $B_5$, $B_6$ (wire 37 and bulbs $L_1$, $L_2$), points $A_5$, $A_4$ (contacts 14c, 14b), point $A_3$ (bracket 16a), point $A_2$ (annular contact 45), point $A_1$ (brush 44) to point $A_7$ (housing 12a) which is grounded. Current is supplied to the winding of motor 31 from contact $B_7$, through the winding of the motor to ground via the contact $A_6$. If four bulbs are used instead of two, added contacts $B_9$, $B_{10}$ and $A_{10}$, $A_{11}$ are provided for supplying current to bulbs $L_3$, $L_4$.

Although, in accordance with the invention, the lamp current is preferably prevented from passing through the journals by electrically insulating the motor housing from the grounded base, in the light of the disclosure, it will be apparent to persons skilled in the art that satisfactorily results can be achieved by making the motor housing, journals or hollow shaft of non-conductive material; it being understood that if the shaft is made of non-conductive material, a circuit must be completed through other means such as wires.

We claim:

1. On a rotating lamp, the combination comprising
   a base,
   a shaft,
   a motor having a housing,
   journal means for journalling said shaft on said housing,
   means for mounting said motor on said base,
   a plurality of bulbs,
   means for mounting said bulbs on said shaft,
   means for completing a lamp circuit through said bulbs,
   means for completing a motor circuit through said motor,
   and means for preventing the current in said lamp circuit from passing through said journal means,
   said means for mounting said motor on said base including means electrically insulating said motor housing from said base.

2. The combination set forth in claim 1 including means for preventing the motor current from passing through said journal means.

3. The combination set forth in claim 1 wherein said means for completing a lamp circuit includes a rod of electrically conductive material,
   said shaft being hollow with said rod extending through said shaft,
   means electrically insulating said shaft from said rod,
   radially extending brush means for supplying current to said rod and means connecting said rod to said bulbs.

4. In a rotating lamp,
   an electrically conductive base,
   a motor including a housing,
   a shaft,
   journal means rotatably mounting said shaft on said motor,
   a plurality of bulbs,
   means for mounting said bulbs on said shaft,
   means for mounting said motor housing on said lamp base and driving said shaft such that said motor housing is electrically insulated from said base,
   means completing a circuit through said bulbs and said base,
   means for completing a circuit through said motor and said base.

5. The combination set forth in claim 4 wherein said means for completing a circuit through said bulbs includes said shaft.

6. In a rotating lamp,
   a base,
   a motor including a housing and a winding,
   means for mounting said motor on said base such that said housing is electrically isolated from said base,
   a shaft extending upwardly from said motor,
   a plurality of bulbs,
   means for mounting said bulbs on said shaft,
   said shaft being hollow,
   a rod of electrically conductive material extending through said shaft and rotatable therewith,
   means for electrically insulating said shaft from said rod,
   means for providing an electrical connection from said rod to said bulbs,
   means for providing an electrical connection from a source to said rod,
   means for providing a grounding from said bulbs to said housing,
   means for providing an electrical connection from a source to said motor.

7. The combination set forth in claim 6 including means for grounding said winding of said motor.

8. The combination set forth in claim 6 wherein said means providing an electrical connection from said source to said rod comprises a brush extending radially and an annular contact on said rod engaged by said brush.

9. The combination set forth in claim 6 wherein said means providing a ground for said bulbs comprises a brush on said base and extending radially and an annular contact on said shaft engaged by said brush.

* * * * *